United States Patent [19]

Sartori et al.

[11] Patent Number: 5,087,685

[45] Date of Patent: Feb. 11, 1992

[54] PROCESS FOR PREPARING POLYCARBOSILANES AND NEW POLYCARBOSILANES

[75] Inventors: Peter Sartori, Rheinberg, Fed. Rep. of Germany; Baudouin van Aefferden, Duisburg, Belgium; Wolfgang Habel, Duesseldorf, Fed. Rep. of Germany

[73] Assignee: Kali-Chemie Aktiengesellschaft, Hanover, Fed. Rep. of Germany

[21] Appl. No.: 445,742

[22] Filed: Dec. 4, 1989

[30] Foreign Application Priority Data

Dec. 8, 1988 [DE]  Fed. Rep. of Germany ....... 3841348

[51] Int. Cl.$^5$ ............................................. C08G 77/04
[52] U.S. Cl. ........................................ 528/25; 528/10; 556/430; 556/431
[58] Field of Search .................... 528/10, 25; 556/430, 556/431

[56] References Cited

U.S. PATENT DOCUMENTS

| | | | |
|---|---|---|---|
| 3,431,221 | 3/1969 | Hoess | 260/2 |
| 4,339,562 | 7/1982 | Guselnikov et al. | 528/35 |
| 4,761,458 | 8/1988 | Burns et al. | 528/25 |

FOREIGN PATENT DOCUMENTS

| | | |
|---|---|---|
| 1446198 | 10/1968 | Fed. Rep. of Germany . |
| 3634281 | 4/1988 | Fed. Rep. of Germany . |
| 896301 | 5/1962 | United Kingdom . |

OTHER PUBLICATIONS

Schilling et al., Office of Naval Research Technical Report 83-2 (1983), and chemical abstract.

*Primary Examiner*—Melvyn I. Marquis
*Attorney, Agent, or Firm*—Foley & Lardner

[57] ABSTRACT

A process for preparing polycarbosilanes by co-condensation of dihalosilanes $R^1R^2SiX_2$ and saturated dihalohydrocarbons Y-A-Y in the presence of an alkali metal, wherein the groups $R^1$, $R^2$, X, Y and A have the meanings given in the claims, and also new polycarbosilanes are described.

37 Claims, No Drawings

PROCESS FOR PREPARING POLYCARBOSILANES AND NEW POLYCARBOSILANES

FIELD OF THE INVENTION

This invention relates to a new process for preparing polycarbosilanes and to new polycarbosilanes.

BACKGROUND OF THE INVENTION

Polycarbosilanes are polymers having a skeletal structure consisting of the elements carbon and silicon, in which Si groups and hydrocarbon groups generally occur alternately. The skeletal structure of such polycarbosilanes consists, for instance, of recurring structural units of the Formula

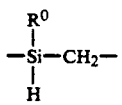

wherein $R^0$ represents, for instance, a hydrocarbon substituent.

The known preparation methods for polycarbosilanes include two types, one of which starts with monosilanes such as tetramethylsilane, trimethyl chlorosilane, dimethyl dichlorosilane or methyl trichlorosilane, which are converted into mixtures of different polycarbosilanes by thermal decomposition by heating the monosilanes to temperatures of about 700° C. and removing the pyrolysis products from the reaction zone after a short while and cooling them. Preferably, compounds having an Si—C—Si structure are then obtained, the proportion of higher-molecular weight compounds in the pyrolysis mixture increasing with rising temperature and longer residence time in the reaction zone; however, the products prepared by this process are very non-uniform and have low molecular weights.

In the other known process for preparing polycarbosilanes, the starting point is polysilanes which are converted by pyrolysis into the polycarbosilane at temperatures of 350°0 to 450 C. With this process, it is necessary for at least one of the two substituents on the silicon atom in the polysilane which is used to be a methyl group, from which during the thermal conversion process a methylene group is formed which is inserted between two adjoining Si atoms, one hydrogen atom remaining on the silicon atom. Using this process, only those polycarbosilanes can be obtained in which the silicon atoms in the polycarbosilane chain can only be linked by methylene bridges and which can always only have one optional substituent RO desired on the silicon atom, while the second substituent is always hydrogen.

The polysilanes which are to be used for the latter process are obtained by condensation of substituted methyl dihalosilanes in the presence of alkali metals. The pyrolysis of such polysilanes leads to non-uniform polycarbosilanes, or other desirable products cannot be obtained, for instance those which have a second substituent on the silicon atom instead of the hydrogen atom, or those which have a different carbon bridge than the methylene bridge between the Si atoms. During pyrolysis, the already formed polycarbosilane partly decomposes and more or less easily volatile products are formed which, however, are undesirable in the polycarbosilane itself.

The use of a pressure reaction vessel, for instance an autoclave, or an apparatus of the circulation type, which permits return into the circulation, is necessary for the preparation of a polycarbosilane having superior thermal stability and oxidation resistance and a high residual weight ratio after pyrolysis in a non-oxidizing atmosphere by known processes. In the case of a process in which a pressure reaction vessel is used, the reaction has to be carried out for 10 to 15 hours at a temperature of 400° to 470° C. and at a pressure of 81 to 111 bar, and it is absolutely essential to provide pressure-resistant equipment and to take steps against the risk of fire. This process has the additional disadvantage that it is not suitable for mass production. In the case of a process in which an apparatus of the circulation type is used, it is necessary to use an apparatus which contains a heat reaction tower, a product separation tower etc., and low molecular weight products have to be recycled obligatorily in the circulation to the heat reaction tower in order to repeat the reaction. Therefore the temperature must be increased to a considerable extent, to 600° to 800° C., and a long reaction time, e.g. 20 to 50 hours, must be used. The latter process therefore has many disadvantages from the industrial point of view.

Polycarbosilanes in which the Si atoms are linked by bridges of organic aromatic or preferably heteroaromatic radicals such as pyrrol-2,5-diyl or thiophen-2,5-diyl are known from DE-OS 36 34 281. In this case, the object is to prepare conductive polysilanes after additional chemical or electrochemical doping.

It is known according to Schilling and Williams (Schilling, C. L., Jnr.; Williams, T. C. (Union Carbide Corp., Tarrytown, N.Y. USA). Report 1983, TR-83-2; Order No. AD-A141558, 15 pp. (Eng). Avail. NTIS. From Gov. Rep. Announce. Index (U.S.) 1984, 84 (18), 48; see also Chemical Abstracts 101: 196821q) to prepare copolymers in tetrahydrofuran from silane monomer units and olefin units in the presence of potassium. Methyltrichlorosilane, dimethyl dichlorosilane or methyl dichlorohydrosilane as silane monomers are reacted with styrene or isoprene, the Si units being linked by phenyl-substituted ethylene units in the case of styrene. In the case of isoprene, the Si units are linked by the corresponding methyl-substituted C4-alkylene chain, which still has a double bond. In two further examples, isoprene is reacted with methylchloromethyl dichlorosilane or with a mixture of vinylmethyl dichlorosilane and trimethyl chlorosilane.

SUMMARY OF THE INVENTION

It is the object of the present invention to provide a process which makes it possible to prepare polycarbosilanes in a simple manner non-pyrolytically, selectively and under mild conditions with high uniformity and purity (e.g. absence of low-molecular weight thermal decomposition products) and with substituents and saturated hydrocarbon bridges which are variable within wide limits, and also to provide new polycarbosilanes with advantageous properties, which can be produced according to this process.

These and other objects are achieved by providing a process for preparing a polycarbosilane based on structural units corresponding to the-formula I

 (I)

wherein
  $R^1$ represents hydrogen, alkyl, cycloalkyl, aryl or arylalkyl, whereby $R^1$ may also have different meanings in different units of one and the same polycarbosilane,
  $R^2$ represents alkyl, cycloalkyl, aryl or arylalkyl, whereby $R^2$ may also have different meanings in different units of one and the same polycarbosilane, and
  A represents a straight-chain or branched alkylene radical or a cycloalkylene radical, whereby A may also have different meanings in different units of one and the same polycarbosilane, comprising reacting at least one dihalosilane corresponding to the formula II

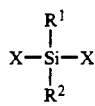 (II)

wherein $R^1$ and $R^2$ have the meanings given above, and X represents halogen, with at least one dihalo-hydrocarbon corresponding to the formula III

 (III)

wherein A has the meaning given above and Y represents chlorine, bromine or iodine, in the presence of an alkali metal.

According to another aspect of the invention, polycarbosilanes of increased uniformity and purity are produced by the process of the invention.

According to a further aspect of the invention, the objects are achieved by providing new polycarbosilanes based on structural units corresponding to the formula I′

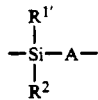 (I′)

wherein
  $R^{1'}$ represents aryl, whereby $R^{1'}$ may also have different meanings in different units of one and the same polycarbosilane,
  $R^2$ represents alkyl, cycloalkyl, aryl or arylalkyl, whereby $R^2$ may also have different meanings in different units of one and the same polycarbosilane, and
  A represents a straight-chain or branched alkylene radical or a cycloalkylene radical, whereby A may also have different meanings in different units of one and the same polycarbosilane.

DETAILED DESCRIPTION OF PREFERRED EMBODIMENTS

The invention relates to a process for preparing polycarbosilanes based on structural units of the general Formula I

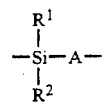 (I)

wherein
  $R^1$ represents hydrogen, alkyl, cycloalkyl, aryl or arylalkyl, whereby $R^1$ may also have different meanings in different units of one and the same polycarbosilane,
  $R^2$ represents alkyl, cycloalkyl, aryl or arylalkyl; whereby $R^2$ may also have different meanings in different units of one and the same polycarbosilane, and
  A represents a straight-chain or branched alkylene radical or for a cycloalkylene radical, whereby A may also have different meanings in different units of one and the same polycarbosilane,
by reacting at least one dihalosilane of the general Formula II,

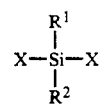 (II)

wherein
  $R^1$ and $R^2$ have the meanings given above, and X represents halogen, preferably chlorine or bromine, with at least one dihalo-hydrocarbon of the general Formula III

 (III)

wherein
  A has the meaning given above, and
  Y represents the halogens chlorine, bromine or iodine, preferably chlorine or bromine,
in the presence of an alkali metal.

According to the invention, in order to produce polycarbosilanes based on structural units of the general Formula I, at least one dihalosilane of the general Formula II is reacted together with at least one saturated dihalohydrocarbon of the general Formula III in the presence of an alkali metal in an inert organic liquid medium.

In general Formula II of the dihalosilanes used, $R^1$ may be hydrogen. $R^2$ then stands for alkyl, cycloalkyl, aryl or arylalkyl.

In general Formula II of the dihalosilanes used, one or both radicals $R^1$ or $R^2$ may stand for alkyl; in this case alkyl has the meaning of a saturated or unsaturated, straight-chain or branched alkyl radical, which may optionally be further substituted by inert radicals. Examples of such alkyl radicals include C1- to C16-alkyl radicals, such as methyl, ethyl, propyl, butyl, pentyl, hexyl, octyl, dodecyl, hexadecyl, isopropyl, isobutyl, tertiary butyl or allyl, but in particular C1- to C6-alkyl radicals, preferably lower alkyl radicals with 1 to 4 C atoms. The foregoing list is neither limiting nor exclusive.

In general Formula II of the dihalosilanes used, one or both radicals $R^1$ or $R^2$ may stand for cycloalkyl; cycloalkyl here has the meaning of a saturated or unsaturated cycloalkyl radical, optionally further substituted by inert radicals. Examples of cycloalkyl include cyclopentyl, cyclohexyl or cyclopentenyl, or cyclohexenyl. The foregoing list is neither limiting nor exclusive.

In general Formula II of the dihalosilanes used, one or both radicals $R^1$ or $R^2$ may stand for aryl; aryl here has the meaning of an unsubstituted or inertly substituted aromatic hydrocarbon radical. Examples of aryl include phenyl, naphthyl, p-diphenyl or alkylaryl groups such as tolyl, ethylphenyl or propylphenyl. The foregoing list is neither limiting nor exclusive.

In the general Formula II of the dihalosilanes used, one or both radicals $R^1$ or $R^2$ may stand for arylalkyl; examples of arylalkyl groups are phenylmethyl or phenylethyl. The foregoing list is neither limiting nor exclusive.

The dichlorosilanes or dibromosilanes are particularly suitable as dihalosilanes for the process according to the invention. Examples of particularly suitable dihalosilanes include dimethyl dichlorosilane, dimethyl dibromosilane, diethyl dichlorosilane, diethyl dibromosilane, methylphenyl dichlorosilane, methylphenyl dibromosilane, diphenyl dichlorosilane or diphenyl dibromosilane. The foregoing list is neither limiting nor exclusive.

In the general Formula III of the saturated dihalohydrocarbons used, A may stand for a straight-chain or branched alkylene radical. C1- to C6-alkylene radicals are advantageous, particularly lower alkyl radicals with 1 to 4 C atoms such as methylene, ethylene, linear propylene (trimethylene), branched propylene, or butylene. However, the foregoing list is neither limiting nor exclusive.

In the general Formula III of the saturated dihalohydrocarbons used, A may stand for a cycloalkylene radical; C4- to C7-cycloalkylene radicals such as cyclopentylene or cyclohexylene are advantageous. However, the foregoing list is neither limiting nor exclusive.

Saturated diiodohydrocarbons, dibromohydrocarbons or dichlorohydrocarbons are particularly suitable as dihalohydrocarbons for the process according to the invention. Examples of particularly suitable saturated dihalohydrocarbons include methylene chloride, methylene bromide, 1,2-dichloroethane, 1,2-dibromoethane, 1,3-dichloropropane, 1,3-dibromopropane, 1,3-diiodopropane, 1,2-dibromopropane, dichlorocyclopentane or dichlorocyclohexane. The foregoing list is neither limiting nor exclusive.

The alkali metal which can be used in the process according to the invention may for instance be lithium, sodium or potassium. The preferred alkali metal is sodium, since it generally produces the highest yields of polycarbosilanes and leads least of all to secondary reactions. In order to ensure complete reaction, it is preferred to operate with a slight excess of alkali metal. The quantity of the alkali metal to be used is about 2.2 Mol per Mol of all the dihalo-compounds used, i.e. for the reaction of 1 Mol dihalosilane with 1 Mol dihalohydrocarbon, overall about 4.4 Mol alkali metal are required.

The organic liquid medium in which the reaction takes place may be any solvent compatible with alkali metals, in which solvent the dihalosilanes and dihalohydrocarbons which are used as reactants are soluble. Preferably, this organic, liquid medium is also a solvent for the polycarbosilanes which are to be prepared using the process of the invention. Suitable solvents may, for instance, be hydrocarbons such as toluene, xylene or paraffins, ethers such as tetrahydrofuran or dioxane, alkylene glycol ethers, for instance ethylene glycol ethers such as diethylene glycol dialkyl ether, propylene glycol ether, polyethylene glycol ether or polypropylene glycol ether, but also nitrogen-containing solvents such as ethylene diamine or mixtures thereof. Advantageously, solvents are used which have boiling points lying above the melting point of the alkali metal used. A preferred solvent is xylene. The quantity of the solvent is variable within wide ranges The use of large quantities of solvents leads, for instance, to polycarbosilanes having a low molecular weight. The alkali metal halides produced during the reaction are usually insoluble and can therefore easily be removed by filtration.

The process can be carried out within wide temperature ranges, the reaction temperature however preferably being kept at temperatures of about 10° to 180° C. The reaction takes place exothermically and is preferably begun at the melting point of the alkali metal used, for instance at about 100 C. when sodium is used During the reaction, it is not necessary to supply external heat If the reaction takes place too violently, cooling may optionally take place; basically, however, cooling is not necessary. Furthermore, the reaction is generally carried out under a suitable protective gas. Suitable protective gases include, for example, nitrogen or argon.

The reaction is generally performed in such a way that a suspension of the alkali metal in the solvent is first produced. Preferred solvents for producing the suspension are hydrocarbons such as xylene or dekalin, into which the alkali metal is introduced in the form of small pieces and is then heated with thorough stirring to temperatures above the melting point of the alkali metal. The resulting alkali metal suspension may be used either directly or after cooling for the further reaction. For this purpose, the other reactants (dihalosilanes, dihalohydrocarbons) are introduced into the alkali metal suspension. This occurs either by simultaneous addition by dropping of the reactants into the metal suspension or by simultaneous introduction of the reactants directly into the metal suspension. It is preferred to introduce the reactants directly into the metal suspension. It is particularly advantageous if the reactants are already mixed together before introduction and are optionally diluted with a suitable solvent.

After the reaction is completed, the polycarbosilane can be isolated from the reaction mixture by any suitable method. If the polycarbosilane is soluble in the solvent, the other insoluble constituents can be separated by filtration. The polycarbosilane remaining in the solvent can be purified by washing with water and dried to a powder by removal of the solvent. If excess alkali metal has been used, this is solubilized in a conventional manner with a suitable alcohol before isolation of the polycarbosilane. Suitable alcohols include methanol, ethanol, isopropanol or tertiary butanol, depending on the alkali metal used. The resulting alkali metal alcoholates are then further decomposed by the addition of water and the alkali metal salts which precipitate are removed by filtration. However, if the resulting polycarbosilanes are insoluble in the solvent, they may be extracted by another suitable solvent, then purified by washing with water and dried to a powder by removal of the solvent.

The process according to the invention provides a simple and generally usable method for the convenient preparation of different polycarbosilanes. The process according to the invention makes it possible to prepare both previously known and also new polycarbosilanes.

By varying the type and number of the reactants used, i.e. the dihalosilanes on one hand and the saturated dihalo-hydrocarbons on the other hand, the process permits preparation of a large number of interesting polycarbosilanes of general Formula I which have not previously been obtainable.

In a variant of the process according to the invention, mixtures of variously substituted dihalosilanes of the general Formula II are reacted together with mixtures of saturated dihalo-hydrocarbons of the general Formula III having differing groups A. By reacting dihalosilane mixtures with dihalo-hydrocarbon mixtures, for instance, polycarbosilanes are obtained in which different structural units of the general Formula I are present adjoining each other, which may differ according to the type and number selected of the reactants used independently of each other in the substituents $R^1$ and/or $R^2$ and/or the radicals A. However, usually a maximum of not more than three different dihalosilanes are reacted together with a maximum of not more than three different dihalo-hydrocarbons at the same time. The reaction of mixtures of not more than a maximum of three different dihalosilanes with only one dihalohydrocarbon or of only one dihalosilane with mixtures of a maximum of three different dihalo-hydrocarbons is particularly advantageous. The ratio of the amount of dihalosilane or dihydrosilane mixture which is used to the amount of dihalo-hydrocarbon or dihalo-hydrocarbon mixture which is used is preferably calculated so that overall there is a molar ratio of dihalosilanes to dihalo-hydrocarbons of 1 : 1; in general, however, deviations from this molar ratio of up to 90% are also possible.

In a preferred variant, only a single dihalosilane is reacted with only a single saturated dihalo-hydrocarbon. In accordance with this process variant, very uniform chain polycarbosilanes are obtained, the substituents $R^1$, $R^2$ and the radical A each having only one meaning in all the structural units of the general Formula I of this polycarbosilane. The molar ratio of the two reactants is preferably 1:1; in general, however, deviations from this molar ratio of up to 90% are also possible.

In another variant of the process according to the invention, it is possible, if desired, to produce an additional selective crosslinking of the linear polycarbosilane chains based on the general structural Formula I. Depending on the degree of crosslinking desired, up to 50 mole percent of the dihalosilane II which is used is then replaced by a trihalosilane of the formula $RSiX_3$, wherein X represents a halogen, preferably chlorine or bromine, and R has the hydrogen, alkyl, cycloalkyl, aryl or arylalkyl meaning given above for $R^1$. The trihalosilane $RSiX_3$ may either be mixed directly into the reactant mixture of dihalosilane II and saturated dihalo-hydrocarbon III to be supplied to the metal suspension, or it may also be introduced into the metal suspension or added to the metal suspension in drops separately from said reactant mixture. Examples of trihalosilanes $RSiX_3$ which can be used include trichlorosilane, methyl tribromosilane, methyl trichlorosilane or phenyl trichlorosilane. According to this process variant, crosslinked polycarbosilanes based on the structural elements of the general Formula I are obtained which additionally contain branched groups of Formula IV

which are again adjoined by Si atoms of structural unit I, and wherein R and A have the above meanings.

Furthermore, in another process variant, the linear polycarbosilane chains based on the general structural Formula I can be crosslinked by adding tetrahalosilanes such as tetrachlorosilane or tetrabromosilane. Crosslinked polycarbosilanes based on the structural elements of general Formula I are obtained which additionally contain branched groups of Formula V

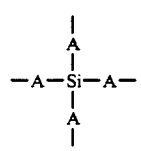

to which are again attached Si atoms of structural unit I, and wherein A has the above meaning.

Furthermore, in another process variant, the degree of condensation of the linear or crosslinked polycarbosilanes to be prepared based on general structural Formula I may be controlled by stopping the condensation by adding condensation-terminating reagents. Suitable reagents for terminating the condensation reaction include monohalosilanes $R'_3SiX$, wherein X represents halogen, preferably chlorine or bromine, and R' has the alkyl, cycloalkyl, aryl or arylalkyl meaning given above for $R^2$. Other suitable reagents for terminating the condensation reaction include monohalohydrocarbons R"Y, wherein Y represents iodine, bromine or chlorine and R" is alkyl or cycloalkyl. Examples of suitable monohalosilanes include trimethyl chlorosilane, trimethyl bromosilane or diphenylmethyl chlorosilane. Examples of suitable monohalo-hydrocarbons include methyl bromide or methyl chloride.

The type of terminal groups present in the polycarbosilanes prepared by the process of the invention depends upon whether the process is carried out with or without chain-terminating reagents. The terminal groups may on one hand be only mono-reacted halosilyl groups of the formulae $R^{1a}R^{2a}Si(X)$—, $R^1R^2Si(X)$— and/or $R^{1b}R^{2b}Si(X)$— and/or halo-hydrocarbon groups of the formula Y—A—, or also $R^{1a}R^{2a}Si(OH)$—, $R^1R^2Si(OH)$— and/or $R^{1b}R^{2b}Si(O\text{-}alkyl)$— groups alkyl)-, $R^1R^2Si(O\text{-}alkyl)$- and/or $R^{1b}R^{2b}Si(O\text{-}alkyl)$- groups which have been produced by solvolysis, or chain-terminating groups, such as trialkylsilyl groups or lower alkyl groups. Examples of terminal groups include dimethyl chlorosilyl, dimethyl bromosilyl, phenylmethyl chlorosilyl, phenylmethyl bromosilyl, diphenyl chlorosilyl, diphenyl bromosilyl, alkyl halide groups such as chloromethyl, bromomethyl, chloroethyl, bromoethyl or 2-chloro-1-methylethyl, or chlorocyclohexyl, dimethyl hydroxysilyl, methylphenyl hydroxysilyl, diphenyl hydroxysilyl, dimethyl methoxysilyl, dimethyl ethoxysilyl, methylphenyl methoxysilyl, methylphenyl ethoxysilyl, diphenyl methoxysilyl, diphenyl ethoxysilyl, or chain-breaking groups such as trimethylsilyl, diphenyl methylsilyl, methyl or ethyl $R^{1a}$, $R^{2a}$, $R^{2b}$, $R^{1'}$, $R^2$, X, Y and A each have the meanings given above or hereafter.

The invention further includes new, more uniform and pure forms of polycarbosilanes based on structural units of the general Formula Ia

(Ia)

wherein
$R^{1a}$ represents hydrogen, alkyl, cycloalkyl or arylalkyl, whereby $R^{1a}$ may also have different meanings in different units of one and the same polycarbosilane, $R^{2a}$ represents alkyl, cycloalkyl or arylalkyl, whereby $R^{2a}$ may also have different meanings in different units of one and the same polycarbosilane, and A represents a straight-chain or branched alkylene radical or for a cycloalkylene radical, whereby A may also have different meanings in different units of one and the same polycarbosilane, prepared using the process of the invention set forth above. These are polycarbosilanes based on structural units of Formula Ia with saturated hydrocarbon bridges A, wherein the radicals alkyl, cycloalkyl, arylalkyl, alkylene and cycloalkylene are defined as set forth above. These polycarbosilanes produced by the process of the invention are distinguished by their greater purity and uniformity over the known products of the prior art produced by the pyrolysis process.

Thus the process of the invention may be used to prepare new, more uniform and highly purified forms of a group of known polycarbosilanes based on structural units of the general Formula Ia, wherein, for instance, the radical $R^{2a}$ has the above meaning, $R^{1a}$ represents hydrogen, and A represents a methylene group. In an example of such polycarbosilanes of Formula Ia, $R^2$ represents methyl.

Furthermore, the invention relates to new polycarbosilanes based on structural units of the general Formula I'

(I')

wherein
$R^{1'}$ represents aryl, whereby R' may also have different meanings in different units of one and the same polycarbosilane, $R^2$ represents alkyl, cycloalkyl, aryl or arylalkyl, whereby $R^2$ may also have different meanings in different units of one and the same polycarbosilane, and A represents a straight-chain or branched alkylene radical or a cycloalkylene radical, whereby A may also have different meanings in different units of one and the same polycarbosilane.

In a variant, the invention also relates to those modifications of the new polycarbosilanes in which up to a maximum of 50% of the structural units of the general Formula I' are replaced by structural units of the general Formula Ib

(Ib)

wherein
$R^{1b}$ represents alkyl, cycloalkyl or arylalkyl, whereby $R^{1b}$ may also have different meanings in different units of one and the same polycarbosilane;

$R^{2b}$ represents alkyl, cycloalkyl or arylalkyl, whereby $R^{2b}$ may also have different meanings in different units of one and the same polycarbosilane, and A represents a straight-chain or branched alkylene radical or a cycloalkylene radical, whereby A may also have different meanings in different units of one and the same polycarbosilane.

These are polycarbosilanes based on structural units of Formula I' or based on structural units of Formulae I' and Ib with saturated hydrocarbon bridges, wherein the radicals alkyl, cycloalkyl, arylalkyl, alkylene and cycloalkylene are defined as set forth below.

In one embodiment of the invention, the polycarbosilane consists of a number of different structural units corresponding to the formulae I' or I' and Ib, which are present next to each other. These structural units may differ from each other in the groups A and/or in the substituents $R^2$ and/or $R^{1'}$ or the substituents $R^{2b}$ and/or $R^{1b}$. Generally, the structural units of the general formulae I' or I' and Ib which make up the polycarbosilane represent combinations of not more than a maximum of three differently substituted Si-units and of not more than a maximum of three different A-units.

In an advantageous variant, A has only a single meaning in all the structural units of the general Formulae I' or I' and Ib of the polycarbosilane Then, polycarbosilanes are provided in which the structural units of the general Formulae I' or I' and Ib are composed of combinations of not more than three differently substituted Si units and only one A unit.

In another advantageous variant, the substituents $R^2$ and $R^{1'}$ or $R^2$, $R^{1'}$, $R^{1b}$ and $R^{2b}$, respectively, each have only a single meaning in all structural units of the general Formulae I' or I' and Ib of the polycarbosilane. In this case, for instance, polycarbosilanes consisting of structural elements of general Formula I' are provided in which all $R^{1'}R^2$ Si units are identical; or, for instance, polycarbosilanes consisting of structural elements of the general Formulae I' and Ib are provided in which only a single type of an $R^{1'}R^2$Si unit and only a single type of an $R^{1b}R^{2b}$Si unit are present.

In a preferred variant, only a single type of structural units of the general Formulae I' or Ib are present in the polycarbosilanes according to the invention. In this case, the $R^{1'}R^2$Si units and the A units are identical in all structural units of the polycarbosilane based on general Formula I'; or polycarbosilanes are provided in which only a single type of a structural element of the general Formula I' and only a single type of a structural element of the general Formula Ib are present, and wherein A is identical in all the structural elements of Formulae I' and Ib.

In the polycarbosilanes according to the invention based on the structural units of Formulae I' or I' and Ib, respectively, the radical $R^{1'}$ may stand for aryl; aryl in this case meaning an unsubstituted or inertly substituted aromatic hydrocarbon radical. Examples of such aryl include phenyl, naphthyl or p-diphenyl, or alkylaryl radicals such as tolyl, ethylphenyl or propylphenyl.

In the polycarbosilanes according to the invention based on the structural units of Formulae I' or I' and Ib, respectively, the radicals $R^2$, $R^{1b}$ and/or $R^{2b}$ may represent alkyl; alkyl in this case meaning a saturated or unsaturated, straight-chain or branched alkyl radical which may optionally be further substituted by inert radicals. Examples of suitable alkyl radicals are C1- to C16-alkyl radicals, such as methyl, ethyl, propyl, butyl, pentyl, hexyl, octyl, dodecyl, hexadecyl, isopropyl, isobutyl, tertiary butyl or allyl, but in particular C1- to C6-alkyl radicals, preferably lower alkyl radicals having 1 to 4 C atoms.

In the polycarbosilanes according to the invention based on the structural units of Formulae I' or I' and Ib, respectively, the radicals $R^2$, $R^{1b}$ and/or $R^{2b}$ may represent cycloalkyl; cycloalkyl in this case meaning a saturated or unsaturated cycloalkyl radical optionally further substituted by inert radicals Examples of such cycloalkyl include cyclopentyl, cyclohexyl, cyclopentenyl or cyclohexenyl.

In the polycarbosilanes according to the invention based on the structural units of Formulae I' or I' and Ib, respectively, the radical $R^2$ may represent aryl; aryl in this case meaning an unsubstituted or inertly substituted aromatic hydrocarbon radical. Examples of such aryl include phenyl, naphthyl, p-diphenyl or alkylaryl radicals such as tolyl, ethylphenyl or propylphenyl.

In the polycarbosilanes according to the invention based on the structural units of Formulae I' or I' and Ib, respectively, the radicals $R^2$, $R^{1b}$ and/or $R^{2b}$ may represent arylalkyl. Examples of such arylalkyl groups include phenylmethyl or phenylethyl.

In a preferred variant of the polycarbosilanes according to the invention based on the structural units of Formulae I' or I' and Ib, respectively, the substituent $R^2$ represents aryl, preferably phenyl. In this case, in the structural units of Formula I', diarylsilylene groups such as arylphenylsilylene are present as $R^{1'}R^2Si$ groups. In a particularly advantageous configuration of this variant of the polycarbosilanes according to the invention based on the structural units of Formulae I' or I' and Ib, respectively, both substituents $R^2$ and $R^{1'}$ are identical. Preferably, both substituents $R^2$ and $R^{1'}$ equal phenyl and the $R^{1'}R^2Si$ group in the structural unit of Formula I' is then diphenylsilylene.

Another advantageous variant of the invention comprises those polycarbosilanes based on the structural units of Formulae I' and Ib, in which $R^{1b}$ and/or $R^{2b}$ represent lower alkyl, preferably methyl, ethyl, propyl or butyl. Examples of such $R^{1b}R^{2b}Si$ units contained in the structural units of Formula Ib are dimethylsilylene, diethylsilylene, dipropylsilylene, dibutylsilylene, methylethylsilylene, methylpropylsilylene, or methylbutylsilylene.

In the polycarbosilanes according to the invention based on the structural units of Formulae I' or I' and Ib, respectively, the unit A may represent a saturated, straight-chain or branched alkylene radical or a saturated cycloalkylene radical. However, C1- to C6-alkylene radicals, such as methylene, ethylene, linear propylene (trimethylene), branched propylene, tetramethylene, pentamethylene or hexamethylene, are particularly advantageous. The lower alkylene radicals having 1 to 4 C atoms are preferred, such as methylene, ethylene, linear or branched propylene or butylene, particularly methylene. However, if A represents a cycloalkylene radical, C4- to C7-cycloalkylene radicals such as cyclopentylene or cyclohexylene are preferred.

The polycarbosilanes according to the invention are solid or liquid, wax-like or crystalline materials having a structure in which substantially all silicon atoms are bonded only to carbon atoms. These polycarbosilanes are characterised in that they have a proportion of Si—Si-bonds of only a maximum of 5%. In the Examples according to the invention, the proportion of Si-Si-bonds is even less than 1%.

The number of structural units which form the polycarbosilanes according to the invention generally lies between 10 and 500, preferably between 30 and 150. The polycarbosilanes thus have average molecular weights in the range of 580 to 300,000 g/mol.

In a variant of the invention, the polycarbosilanes may be crosslinked by branched groups of the general Formulae IV and/or V

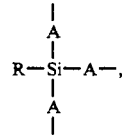

(IV)

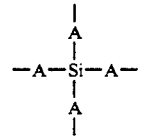

(V)

wherein

A has the above meaning, and

R has the meaning hydrogen, alkyl, cycloalkyl, aryl or arylalkyl given for $R^1$ above The polycarbosilanes according to the invention may be up to 50% crosslinked by the branched groups IV and/or V.

The polycarbosilanes according to the invention based on the general structural units of Formulae I' or I' and Ib, respectively, may have different terminal groups. The terminal groups may on one hand be only mono-reacted halosilyl groups of the formulae $R^{1a}R^{2a}Si(X)$—, $R^{1'}R^2Si(X)$— and/or $R^{1b}R^{2b}Si(X)$— and/or halo-hydrocarbon groups of the formula Y—A— or also $R^{1a}R^{2a}Si(OH)$—, $R^{1'}R^2Si(OH)$— and/or $R^{1b}R^{2b}Si(OH)$— and/or $R^{1a}R^{2a}Si(O\text{-alkyl})$—, $R^{1'}R^2Si(O\text{-alkyl})$- and/or $R^{1b}R^{2b}Si(O\text{-alkyl})$—groups which have been produced by solvolysis, or on the other hand chain-terminating groups, such as trialkylsilyl groups or lower alkyl groups. Examples of terminal groups include dimethyl chlorosilyl, dimethyl bromosilyl, phenylmethyl chlorosilyl, phenylmethyl bromosilyl, diphenyl chlorosilyl, diphenyl bromosilyl, alkyl halide groups such as chloromethyl, bromomethyl, chloroethyl, bromoethyl, 2-chloro-1-methylethyl or chlorocyclohexyl, dimethyl hydroxysilyl, methylphenyl hydroxysilyl, diphenyl hydroxysilyl, dimethyl methoxysilyl, dimethyl ethoxysilyl, methylphenyl methoxysilyl, methylphenyl ethoxysilyl, diphenyl methoxysilyl, diphenyl ethoxysilyl or chain breaking groups such as trimethylsilyl, diphenyl methylsilyl, methyl or ethyl.

The process according to the invention makes it possible advantageously to prepare polycarbosilanes directly from monomeric dihalosilanes without having to use the circuitous route via polysilanes and their pyrolytic conversion into the polycarbosilane. It is a very gentle process which makes it possible to prepare polycarbosilanes of high purity. In particular, the product polycarbosilanes produced by the process of the invention are more uniform and have greater purity than the known polycarbosilanes obtained by pyrolysis.

Furthermore, the process according to the invention makes it possible to produce new polycarbosilanes which have hitherto been inaccessible. A particular feature of a group of the polycarbosilanes according to the invention is the aryl substituents contained therein. Thus, in the polycarbosilanes based on structural units of Formula I' or Formulae I' and Ib, respectively, the substituents $R1'$ in each case are aryl substituents and the substituents $R^2$ may be aryl substituents; in the polycarbosilanes based on the structural units of Formulae I' and Ib, therefore, 25 to 50% of the substituents $R^{1'}$, $R^2$, $R^{1b}$ and $R^{2b}$, or in the polycarbosilanes based on the structural units of Formula I', even 50 to 100% of the substituents $R^{1'}$ and $R^2$ are aryl substituents. In particularly advantageous polycarbosilanes of the invention, the aryl substituents are phenyl radicals.

The new polycarbosilanes according to the invention are further distinguished by defined properties which are determined by selective variation of the molecule size, the number and type of crosslinks, as well as by appropriate selection of the groups A, $R^2$, $R^{1'}$, $R^{1b}$ and $R^{2b}$.

The polycarbosilanes according to the invention are suitable on one hand as valuable starting polymers for the preparation of high-quality industrial silicon carbide ceramics, but on the other hand are also outstandingly suitable for diverse other industrial applications, for example as binders or coating materials.

The invention will be explained further below with reference to examples, but without being limited thereby. Parts and percentages set forth therein are to be understood as parts by weight or weight percent. All the reactions were carried out in standard laboratory apparatus, if necessary under a protective gas atmosphere of nitrogen or argon.

EXAMPLE 1

A mixture of 475 g diphenyl dichlorosilane and 326 g methylene bromide was introduced into a suspension of 185 g sodium in 2000 ml xylene at a temperature of 100° C. During the course of the exothermic reaction, the temperature of the reaction solution rose to 132° C. After the introduction of the entire mixture, the reaction solution was stirred for another hour without applying heat. Unreacted sodium was reacted by subsequent addition of 300 ml methanol, and the solution was freed of sodium halides by filtration. After repeated extraction of the filtrate with water, the xylene phase was separated, filtered again, the xylene was distilled off, and the remaining polycarbosilane was dried in vacuo By this method, 349 g of solid polycarbosilane was obtained The elemental analysis of this material yielded a content of 79.61% C, 6.14% H and 14.2% Si. IR- and 1H-NMR-analyses showed the presence of phenyl bonds as well as Si-phenyl and Si-methylene bonds. The proportion of Si-Si bonds was less than 1%.

EXAMPLE 2

A mixture of 63.3 g diphenyl dichlorosilane, 32.3 g dimethyl dichlorosilane and 86.9 g methylene bromide was introduced into a suspension of 49.2 g sodium in 300 ml xylene at a temperature of 130 C. During the course of the exothermic reaction, the temperature of the solution increased to 132° C. After introduction of the entire mixture, the reaction solution was stirred for another hour without applying heat. Unreacted sodium was reacted by subsequent addition of 200 ml methanol, and the solution was freed of sodium halides by filtration. After repeated extraction of the filtrate with water, the xylene phase was separated, filtered again, the xylene was distilled off, and the remaining polycarbosilane was dried in vacuo. In this way, 53.7 g of solid polycarbosilane were obtained. The elemental analysis of this material yielded a content of 71.26% C, 7.09% H and 21.12% Si. IR- and 1H-NMR-analyses showed the presence of Si-phenyl, Si-methyl and Si-methylene bonds. The proportion of Si—Si bonds was less than 1%.

EXAMPLE 3

A mixture of 89.5 g methyl dichlorosilane, 4.76 g trichlorosilane, 5.26 g methyl trichlorosilane and 74.2 g methylene chloride was introduced within a period of 45 minutes into a suspension of 84 g sodium in 200 ml dekalin at a temperature of 180° C. During the course of the exothermic reaction, the reaction temperature was maintained at 180° C. After introduction of the mixture, the reaction solution was stirred for another hour at 180° C., then cooled, and unreacted sodium was reacted with 200 ml methanol. The reaction solution was filtered, and both the residue and the filtrate were extracted several times with water in order to remove the sodium chloride produced. 15 g of a solid, insoluble polycarbosilane were recovered from the residue after drying in vacuo. After extraction of the filtrate with water, separation of the dekalin phase and distillation off of the dekalin, the resulting polycarbosilane was dried in vacuo. 11.3 g of a soluble, viscous polycarbosilane were isolated. The elemental analysis of the material obtained yielded a content of 38.2% C, 9.95% H and 51.5% Si. IR- and 1H-NMR-analyses showed the presence of Si-methyl, Si-methylene and Si—H bonds. The proportion of Si-Si bonds was less than 1%.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all subject matter falling within the ambit of the appended claims and equivalents thereof.

What is claimed is:

1. A process for preparing a polycarbosilane based on structural units corresponding to the formula I

wherein
$R^1$ represents hydrogen, alkyl, cycloalkyl, aryl or arylalkyl, whereby $R^1$ may also have different meanings in different units of one and the same polycarbosilane, R² represents alkyl, cycloalkyl, aryl or arylalkyl, whereby R² may also have different meanings in different units of one and the same polycarbosilane, and A represents a straight-chain or branched alkylene radical or a cycloalkylene radical, whereby A may also have different meanings in different units of one and the same polycarbosilane, comprising reacting at least one dihalosilane corresponding to the formula II $$\begin{array}{c} R^1 \\ | \\ X-Si-X \\ | \\ R^2 \end{array} \quad (II)$$

wherein R¹ and R² have the meanings given above, and X represents halogen, with at least one dihalo-hydrocarbon corresponding to the formula III $$Y-A-Y \quad (III)$$

wherein A has the meaning given above and Y represents chlorine, bromine or iodine, in the presence of an alkali metal.

2. A process according to claim 1, wherein X and Y are each individually selected from the group consisting of chlorine and bromine.

3. A polycarbosilane based on structural units corresponding to the formula Ia $$\begin{array}{c} R^{1a} \\ | \\ -Si-A- \\ | \\ R^{2a} \end{array} \quad (Ia)$$

wherein

R$^{1a}$ represents hydrogen, alkyl, cycloalkyl or arylalkyl, whereby R$^{1a}$ may also have different meanings in different units of one and the same polycarbosilane, R$^{2a}$ represents alkyl, cycloalkyl or arylalkyl, whereby R² ᵃ may also have different meanings in different units of one and the same polycarbosilane, and A represents a straight-chain or branched alkylene radical or a cycloalkylene radical, whereby A may also have different meanings in different units of one and the same polycarbosilane, prepared according to the process of claim 1.

4. A polycarbosilane based on structural units corresponding to the formula I'.

wherein

R¹′ represents aryl, whereby R¹′ may also have different meanings in different units of one and the same polycarbosilane, R² represents alkyl, cycloalkyl, aryl or arylalkyl, whereby R² may also have different meanings in different units of one and the same polycarbosilane, and A represents a straight-chain or branched alkylene radical or a cycloalkylene radical, whereby A may also have different meanings in different units of one and the same polycarbosilane.

5. A modified polycarbosilane according to claim 4, wherein up to 50% of the structural units of formula I' are replaced by structural units corresponding to the formula Ib $$\begin{array}{c} R^{1b} \\ | \\ -Si-A- \\ | \\ R^{2b} \end{array} \quad (Ib)$$

wherein

R$^{1b}$ represents alkyl, cycloalkyl or arylalkyl, whereby R$^{1b}$ may also have different meanings in different units of one and the same polycarbosilane, R$^{2b}$ represents alkyl, cycloalkyl or arylalkyl, whereby R$^{2b}$ may also have different meanings in different units of one and the same polycarbosilane, and A has the meanings given in claim 4.

6. A polycarbosilane according to claim 4, wherein A is the same in all the structural units of the polycarbosilane.

7. A polycarbosilane according to claim 5, wherein A is the same in all the structural units of the polycarbosilane.

8. A polycarbosilane according to claim 4, wherein the substituent R² is the same in all structural units of the polycarbosilane, and the substituent R¹′ is the same in all structural units of the polycarbosilane.

9. A polycarbosilane according to claim 6, wherein the substituent R² is the same in all structural units of the polycarbosilane, and the substituent R¹′. is the same in all structural units of the polycarbosilane.

10. A polycarbosilane according to claim 5, wherein the substituents R² and R¹′ each have only a single meaning in all structural units of the polycarbosilane corresponding to formula I', and the substituents R$^{2b}$ and R$^{1b}$ each have only a single meaning in all structural units of the polycarbosilane corresponding to formula Ib.

11. A polycarbosilane according to claim 7, wherein the substituents R² and R¹′ each have only a single meaning in all structural units of the polycarbosilane corresponding to formula I', and the substituents R$^{2b}$ and R$^{1b}$ each have only a single meaning in all structural units of the polycarbosilane corresponding to formula Ib.

12. A polycarbosilane according to claim 4, wherein R² represents an aryl group.

13. A polycarbosilane according to claim 12, wherein R² represents a phenyl group.

14. A polycarbosilane according to claim 12, wherein the substituents R² and R¹′ are identical.

15. A polycarbosilane according to claim 14, wherein the substituents R² and R′ are each phenyl.

16. A polycarbosilane according to claim 5, wherein at least one of R$^{1b}$ and R$^{2b}$ represents a lower alkyl group.

17. A polycarbosilane according to claim 16, wherein said lower alkyl group is selected from the group consisting of methyl, ethyl, propyl and butyl.

18. A polycarbosilane according to claim 4, wherein A represents a straight-chain or branched C1- to C6-alkylene group or a C4- to C7-cycloalkylene group.

19. A polycarbosilane according to claim 5, wherein A represents a straight-chain or branched C1- to C6-alkylene group or a C4- to C7-cycloalkylene group.

20. A polycarbosilane according to claim 18, wherein A represents a C1- to C3-alkylene group selected from the group consisting of methylene, ethylene, and linear or branched propylene.

21. A polycarbosilane according to claim 19, wherein A represents a C1- to C3-alkylene group selected from the group consisting of methylene, ethylene, and linear or branched propylene.

22. A polycarbosilane according to claim 18, wherein A represents a cycloalkylene group selected from the group consisting of cyclopentylene and cyclohexylene.

23. A polycarbosilane according to claim 19, wherein A represents a cycloalkylene group selected from the group consisting of cyclopentylene and cyclohexylene.

24. A polycarbosilane according to claim 4, wherein said polycarbosilane has a proportion of Si—Si bonds of at most 5%.

25. A polycarbosilane according to claim 5, wherein said polycarbosilane has a proportion of Si—Si bonds of at most 5%.

26. A polycarbosilane according to claim 4, wherein said polycarbosilane is formed of molecules containing an average number of structural units between 10 and 500.

27. A polycarbosilane according to claim 5, wherein said polycarbosilane is formed of molecules containing an average number of structural units between 10 and 500.

28. A polycarbosilane according to claim 26, wherein the molecules of said polycarbosilane contain an average number of structural units between 30 and 150.

29. A polycarbosilane according to claim 27, wherein the molecules of said polycarbosilane contain an average number of structural units between 30 and 150.

30. A polycarbosilane according to claim 4, wherein said polycarbosilane has an average molecular weight in the range from 580 to 300,000 g/mol.

31. A polycarbosilane according to claim 5, wherein said polycarbosilane has an average molecular weight in the range from 580 to 300,000 g/mol.

32. A polycarbosilane according to claim 4, further comprising up to 50% branched structural units corresponding to at least one of the formulae IV or V

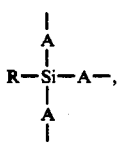

(IV)

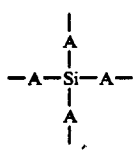

(V)

wherein
A has the meaning given in claim 4, and R represents hydrogen, alkyl, cycloalkyl, aryl or arylalkyl.

33. A polycarbosilane according to claim 5, further comprising up to 50% branched structural units corresponding to at least one of the formulae IV or V

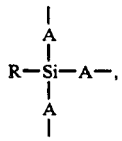

(IV)

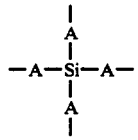

(V)

wherein
A represents a straight-chain or branched alkylene radical or a cycloalkylene radical, whereby A may also have different meanings in different units of one and the same polycarbosilane, and
R represents hydrogen, alkyl, cycloalkyl, aryl or arylalkyl.

34. A polycarbosilane according to claim 4, wherein said polycarbosilane carries mono-reacted terminal groups selected from the group consisting of $R^{1a}R^{2a}Si(X)$— and $R^{1'}R^2Si(X)$—halosilyl groups, Y—A—halo-hydrocarbon groups, $R^{1a}R^{2a}Si(OH)$— and $R^{1'}R^2Si(OH)$— hydroxysilyl groups, $R^{1a}R^{2a}Si(O\text{-}alkyl)$— and $R^{1'}R^2Si(O\text{-}alkyl)$- alkoxysilyl groups, and trialkylsilyl and lower alkyl chain-terminating groups, wherein
$R^{1a}$ represents hydrogen, alkyl, cycloalkyl or arylalkyl, whereby $R^{1a}$ may also have different meanings in different units of one and the same polycarbosilane,
$R^{2a}$ represents alkyl, cycloalkyl or arylalkyl, whereby $R^{2a}$ may also have different meanings in different units of one and the same polycarbosilane,
X represents halogen,
Y represents iodine, bromine or chlorine, and
$R^{1'}$, $R^2$ and A have the meanings given in claim 4.

35. A polycarbosilane according to claim 34, wherein said terminal groups are selected from the group consisting of $R^{1b}$ $R^{2b}$ Si(X)— halosilyl groups, Y—A—halohydrocarbon groups, $R^{1b}R^{2b}Si(OH)$— hydroxysilyl groups, $R^{1b}$ $R^{2b}$ Si(O-alkyl)- alkoxysilyl groups, and trialkylsilyl and lower alkyl chain-terminating groups, wherein
$R^{1b}$ represents alkyl, cycloalkyl or arylalkyl, whereby $R^{1b}$ may also have different meanings in different units of one and the same polycarbosilane,
$R^{2b}$ represents alkyl, cycloalkyl or arylalkyl, whereby $R^{2b}$ may also have different meanings in different units of one and the same polycarbosilane, and
A represents a straight-chain or branched alkylene radical or a cycloalkylene radical, whereby A may also have different meanings in different units of one and the same polycarbosilane, and
X and Y have the meanings given in claim 34.

36. A polycarbosilane according to claim 5, wherein said polycarbosilane carries mono-reacted terminal groups selected from the group consisting of $R^{1a}R^{2a}Si(X)$— and $R^{1'}R^2Si(X)$— halosilyl groups, Y—A—halo-hydrocarbon groups, $R^{1a}R^{2a}Si(OH)$— and $R^{1'}R^2Si(OH)$— hydroxysilyl groups, $R^{1a}R^{2a}Si(O\text{-}alkyl)$- and $R^{1'}R^2Si(O\text{-}alkyl)$- alkoxysilyl groups, and trialkylsilyl and lower alkyl chain-terminating groups, wherein $R^{1a}$ represents hydrogen, alkyl, cycloalkyl or arylalkyl, whereby $R^{1a}$ may also have different meanings in different units of one and the same polycarbosilane, $R^{2a}$ represents alkyl, cycloalkyl or arylalkyl, whereby $R^{2a}$ may also have different meanings in different units of one and the same polycarbosilane, X represents halogen, Y represents iodine, bromine or chlorine, and $R^{1'}$ represents aryl, whereby $R^{1'}$ may also have different meanings in different units of one and the same polycarbosilane, $R^2$ represents alkyl, cycloalkyl, aryl or arylalkyl, whereby $R^2$ may also have different meanings in different units of one and the same polycarbosilane, and A represents a straight-chain or branched alkylene radical or a cycloalkylene radical, whereby A may also have different meanings in different units of one and the same polycarbosilane.

37. A polycarbosilane according to claim 36, wherein said terminal groups are selected from the group consisting of $R^{1b} R^{2b} Si(X)$- halosilyl groups, Y—A— halohydrocarbon groups, $R^{1b} R^{2b} Si(OH)$- hydroxysilyl groups, $R^{1b} R^{2b} (Si(O\text{-alkyl})$- alkoxysilyl groups, and trialkylsilyl and lower alkyl chain-terminating groups, wherein $R^{1b}$ represents alkyl, cycloalkyl or arylalkyl, whereby $R^{1b}$ may also have different meanings in different units of one and the same polycarbosilane, $R^{2b}$ represents alkyl, cycloalkyl or arylalkyl, whereby $R^{2b}$ may also have different meanings in different units of one and the same polycarbosilane, and A represents a straight-chain or branched alkylene radical or a cycloalkylene radical, whereby A may also have different meanings in different units of one and the same polycarbosilane, and X and Y have the meanings given in claim 36.

* * * * *